No. 850,720. PATENTED APR. 16, 1907.
D. R. BALDWIN.
FARRIER'S KNIFE.
APPLICATION FILED JULY 13, 1906.
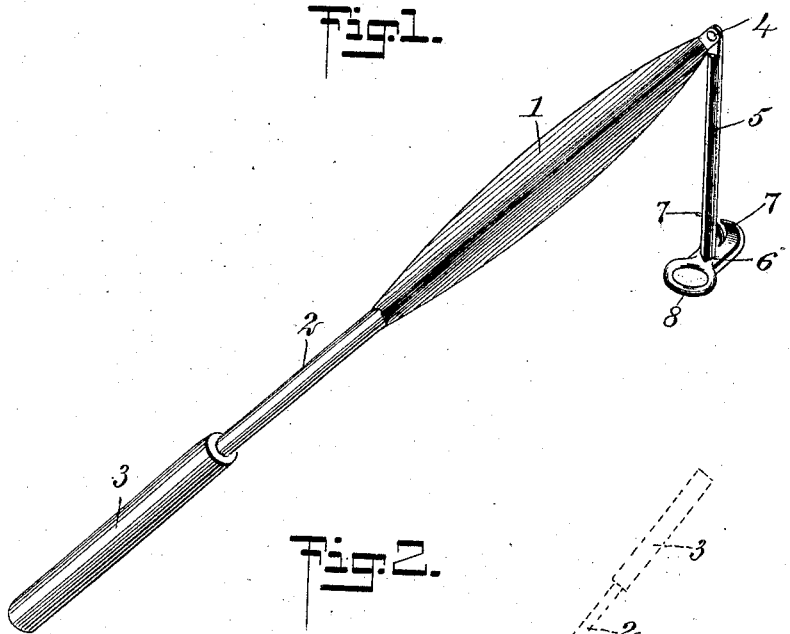
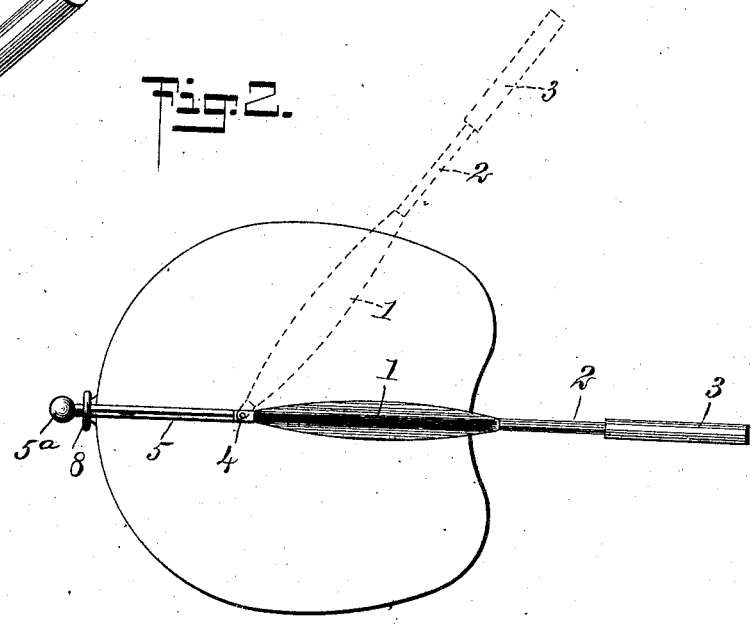
WITNESSES
INVENTOR
Daniel R. Baldwin
BY
ATTORNEYS

UNITED STATES PATENT OFFICE.

DANIEL R. BALDWIN, OF RAVENDEN SPRINGS, ARKANSAS.

FARRIER'S KNIFE.

No. 850,720.   Specification of Letters Patent.   Patented April 16, 1907.

Application filed July 13, 1906. Serial No. 325,995.

*To all whom it may concern:*

Be it known that I, DANIEL R. BALDWIN, a citizen of the United States, and a resident of Ravenden Springs, in the county of Randolph and State of Arkansas, have invented a new and Improved Farrier's Knife, of which the following is a full, clear, and exact description.

This invention is an improved implement employed by horseshoers for trimming the hoofs of animals preparatory to applying the shoes thereto.

Among other objects of the invention is to provide a simple and effective device of this character that will lighten the arduous work of paring an animal's hoof, which in dry and glassy hoofs requires considerable muscular exertion.

With this in view the invention, generally stated, consists in a thin double-cutting-edged paring-blade adapted to be pivotally attached at the bottom of a hoof and positively held in adjusted relation thereto as it is swung on its pivotal connection to remove the outer surface.

Reference is to be had to the accompanying drawings, forming a part of this specification, in which similar characters of reference indicate corresponding parts in both figures.

Figure 1 is a perspective view of the implement complete, and Fig. 2 is a plan view of the implement as applied to the bottom of an animal's hoof.

The implement comprises a thin paring-blade 1, having a cutting edge at each side and a rearwardly-extending shank 2, to which any suitable form of handle 3 is applied. The forward end of the blade is pivotally connected at 4 to a slim triangular or other form of bar 5, having at its outer end a ball or other swelled portion 5ª, acting as a stop to limit the outward movement of a clamping member 6, slidably mounted on the bar. The clamping member 6 is constructed as best shown in Fig. 1, comprising forked jaws 7, curved inwardly at one side of the bar for engaging with the hoof and a handhold 8 of any desired shape, but preferably a ring extending at the opposite side of said bar for assisting in holding the latter as the blade is revolved.

In the application of the implement the parts are disposed in relation to the hoof as shown in Fig. 2, with the bar and the blade resting on the bottom of the hoof and the forked jaws 7 of the clamping member 6 in engagement with the hoof side. By now rotating the blade by means of the handle 3 with one hand while holding the handhold 8 with the other hand the blade can be brought into action at any portion of the hoof-bottom and readily pared off to suit the shoe with ease, the clamping member 6 of course being adapted to be turned about to engage any portion of the hoof's periphery, and since it is adjustable on the bar 5 the cutting portion of the blade can be brought into action at any place on the hoof's surface, enabling the trimming-action to reach all points.

In practice it is found unnecessary to employ any device for securing the member 6 in adjusted position on the bar 5, as a bite will be automatically formed between them when the cutting-blade is in operation and prevent any relative movement between these parts.

Although I have particularly described the invention in detail, it is to be understood that the scope thereof is limited by the annexed claims only.

Having thus described my invention, I claim as new and desire to secure by Letters Patent—

1. In a hoof-trimmer, a paring-blade, a clamping-jaw for engaging the side of the hoof, means pivotally connecting the jaw with the blade, and a handhold slidable on said means for holding the jaw when the blade is operated.

2. In a hoof-trimmer, a paring-blade, a bar pivotally connected to the outer end thereof, and means slidable on the bar adapted to engage the side of a hoof and frictionally engage the bar when the blade is operated.

3. In a hoof-trimmer, paring means, means pivotally connected thereto, and clamping means having a handhold adjustable on said pivotally-connected means for the purpose described.

4. In a hoof-trimmer, a paring-blade, a bar pivotally connected at the outer end thereof, clamping means having a handhold adjustable on the bar, and means for limiting the outward movement of the clamping means.

In testimony whereof I have signed my name to this specification in the presence of two subscribing witnesses.

DANIEL R. BALDWIN.

Witnesses:
J. S. DECKER,
AARON McMULLIN.